United States Patent [19]

Abdo et al.

[11] Patent Number: 4,679,629

[45] Date of Patent: Jul. 14, 1987

[54] METHOD FOR MODIFYING INJECTIVITY PROFILE WITH BALL SEALERS AND CHEMICAL BLOCKING AGENTS

[75] Inventors: Milton K. Abdo, Dallas; Alfred R. Jennings, Jr., Plano, both of Tex.

[73] Assignee: Mobil Oil Corporation, New York, N.Y.

[21] Appl. No.: 707,271

[22] Filed: Mar. 1, 1985

[51] Int. Cl.⁴ .......................................... E21B 33/138
[52] U.S. Cl. .................................. 166/281; 166/284; 166/285
[58] Field of Search ............... 166/281, 284, 285, 287, 166/307

[56] References Cited

U.S. PATENT DOCUMENTS

| | | | |
|---|---|---|---|
| 2,813,584 | 11/1957 | Teplitz | 166/281 X |
| 3,010,514 | 11/1961 | Fox | 166/21 |
| 3,658,129 | 4/1972 | Lanning et al. | 166/270 |
| 3,818,990 | 6/1974 | Coulter | 166/280 |
| 4,085,798 | 4/1978 | Schweitzer et al. | 166/252 |
| 4,153,118 | 5/1979 | Hart | 175/4.51 |
| 4,157,116 | 6/1979 | Coulter | 166/281 X |
| 4,194,561 | 3/1980 | Stokley et al. | 166/162 |
| 4,244,425 | 1/1981 | Erbstoesser | 166/284 |
| 4,261,421 | 4/1981 | Watanabe | 166/281 |
| 4,265,311 | 5/1981 | Ely | 166/271 |
| 4,287,952 | 9/1981 | Erbstoesser | 166/284 |

Primary Examiner—Stephen J. Novosad
Assistant Examiner—Thomas J. Odar
Attorney, Agent, or Firm—Alexander J. McKillop; Michael G. Gilman; Charles A. Malone

[57] ABSTRACT

A method for modifying the injectivity profile of hydrocarbonaceous formations penetrated by at least one injection well and one production well which formation contains zones of varying permeabilities. Via this method, ball sealers are used to stop fluids from flowing through a zone of greater permeability while a zone of lesser permeability receives a temporary blocking agent. Thereafter, the ball sealers are removed and the zone of greater permeability is closed with a permanent blocking agent. Subsequently, the temporary blocking agent is removed and water flooding is reinstituted leading to improved oil recovery.

11 Claims, 1 Drawing Figure

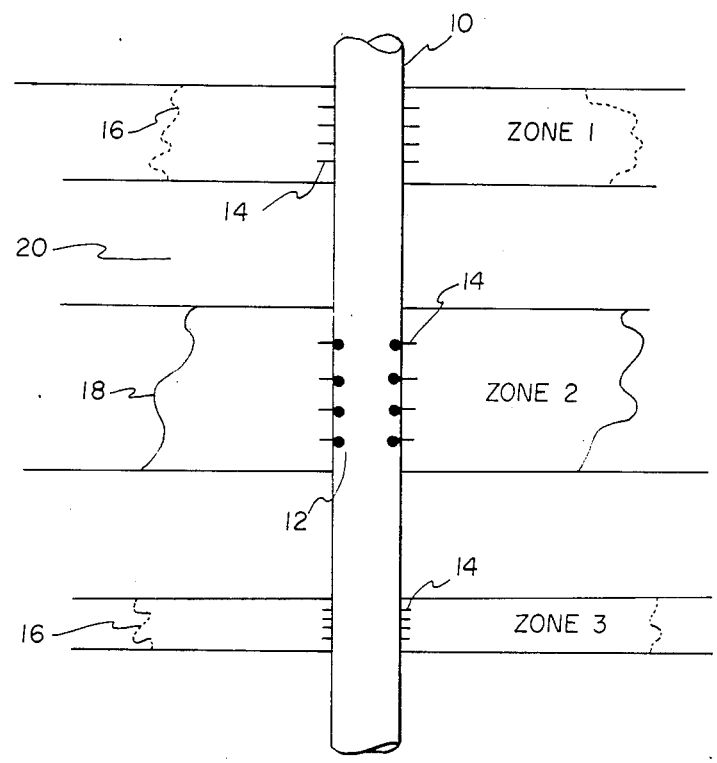

METHOD FOR MODIFYING INJECTIVITY PROFILE WITH BALL SEALERS AND CHEMICAL BLOCKING AGENTS

FIELD OF THE INVENTION

This invention relates to secondary and tertiary methods of oil recovery and, more particularly, to an improved method for controlling the progress and shape of a flood front when oil is recovered by flooding a formation or reservoir which contains zones of varying permeability.

BACKGROUND OF THE INVENTION

In oil production, primary operations are frequently ineffective in recovering a substantial proportion of the oil-in-place, often leaving as much as 60 to 80% of the oil as residual. It is common, therefore, to employ so-called secondary and tertiary methods to obtain additional oil. One such secondary or tertiary method involves flooding the producting formation with an oil-displacement fluid, such as water, steam, gases, etc., through one or more injection wells spaced from the producing well. As the leading edge, or front, of the flood fluid progresses through the formation, the oil in the formation is pushed towards the producing well. Where plural injection wells are used, the fluids from neighboring wells may merge to form a combined front, and such combined front may indeed completely surround a producing well.

In general, the geological and fluid properties (saturations, permeabilities, etc.) of hydrocarbonaceous zones cause uneven forward movement of the native or injected fluids. In addition, the extent of uneven fluid movement increases with hydrocarbon recovery, field operations, and type of well pattern used in enhanced recovery operations. Often a formation or reservoir will contain zones of varying degrees of permeability. During a water flood or other recovery method, hydrocarbonaceous fluids will be removed from the higher permeability zone while the lower permeability zone retains hydrocarbonaceous fluids. These retained fluids often cannot be removed without blocking off the zone of higher permeability and diverting the injected fluid to the zone of lower permeability.

Therefore, what is needed is a method for the selective injection of fluids to improve the injectivity profile in multiple zone formations in cased and perforated wells which will provide for blocking off a zone of higher permeability and allow for the production of hydrocarbonaceous fluids from a zone of lower permeability.

SUMMARY OF THE INVENTION

This invention is directed to a method for selectively closing off zones in a hydrocarbonaceous fluid producing formation or reservoir which contains at least one zone of greater permeability and at least one zone of lesser permeability which method enables the production of increased amount of hydrocarbonaceous fluids. Said zones are in fluid communication with at least one injection well and at least one production well.

In the practice of the invention, the permeability profile of the formation is determined including the existence of at least one zone of greater permeability and at least one zone of lesser permeability. Later, an injection fluid containing ball sealers sufficient to seal off said zone of greater permeability is introduced into said injection well. Subsequently, a temporary blocking agent is introduced into said zone of lesser permeability which blocks the flow of fluids there through. Afterwards, the ball sealers which sealed off the zone of greater permeability are removed therefrom. Next, a permanent blocking agent is introduced into said zone of greater permeability after the ball sealers have been removed. Placement of the permanent blocking agent into perforations in said injection well causes a permanent cessation in the flow of fluids through said zone of greater permeability.

Once said zone of permanent permeability has been closed, said temporary blocking agent is removed from said zone of lesser permeability by a suitable reaction sufficient for said removal. Subsequent to the removal of said temporary blocking agent, a secondary recovery operation, e.g. a waterflood is instituted to recover hydrocarbonaceous fluids from said zone of lesser permeability which is in fluid communication with at least one production well.

It is an object of this invention to prevent "fingering" in a formation having a zone of greater permeability while allowing the removal of hydrocarbonaceous fluids from a zone of lesser permeability contained in the same formation.

It is a further object of this invention to provide a method for the introduction of fluids to remove hydrocarbonaceous fluids from zones of lesser permeabilities while blocking the flow of fluids through a zone of greater permeability where both zones are contained in the same formation.

It is a yet further object of this invention to substantially decrease the down time for treating a formation which has varying permeability characteristics in order to recover hydrocarbonaceous fluids therefrom.

It is a still further object of this invention to provide an economical and cost effective method for controlling the production of hydrocarbonaceous fluids from formations having zones of varying permeabilities.

BRIEF DESCRIPTION OF THE DRAWING

The drawing is a schematic representation of a well penetrating a hydrocarbonaceous formation which formation contains zones of varying permeabilities.

DESCRIPTION OF THE PREFERRED EMBODIMENTS

In the practice of this invention, the injectivity profile of the formation or reservoir is determined. This determination can be made by utilizing one of the methods currently available.

Presently, there are at least three methods for determining the injectivity profile in a well fluidly connected to a hydrocarbonaceous formation or reservoir. One is the spinner survey. Another is the temperature log. The third is the radioactive log. The radioactive log is obtained following the injection of a radioactive tracer and is generally considered to be the most reliable. This method is exemplified in U.S. Pat. No. 4,085,798 issued Apr. 25, 1978 to Schweitzer et al. This patent is hereby incorporated by reference. After obtaining the injectivity profile of the formation or reservoir, areas can be ascertained where "fingering" or "flooding breakthrough" has occurred. Also, a determination can be made concerning areas having insufficient porosity for hydrocarbonaceous fluid carrying capacity. Once these determinations have been made, decisions can be reached regarding areas in the formation or reservoir requiring porosity size enhancement or reduction which will lead to increased production of hydrocarbonaceous fluids.

As is known to those skilled in the art, the invention described herein will work in systems employing at least one injection well and at least one production well. Referring to the drawing, one injection well is shown which is in fluid communication with two production wells (not shown). As indicated in the drawing, zone 2 has been selected for closing off as "fingering" has occurred at this zone. Zones 3 and 4 are zones of lesser permeability. Subsequently, ball sealers are injected into well 10. After being injected into the wellbore 10, the ball sealers 12 can be placed by an apparatus and method as described by Stokey et al. in U.S. Pat. No. 4,194,561 issued Mar. 25, 1980, which is hereby incorporated by reference. Thereafter, a selected fluid flow rate and pressure are determined. After this determination is made, an injection or carrier fluid along with ball sealers 12 are injected into the wellbore 10 which wellbore contains perforations 14. Clark, in U.S. Pat. No. 4,153,118 issued May 8, 1979 describes a method and an apparatus for perforating boreholes. This patent is hereby incorporated by reference.

After entering the borehole 10, the ball sealers 12 can be seated in the perforations 14 in the well to cease a flowing of carrier fluid into zone 2 of hydrocarbonaceous formation 20. Erbstoesser, in U.S. Pat. No. 4,244,425 issued Jan. 13, 1981 describes a method for insertion of ball sealers in a wellbore. This patent is hereby incorporated by reference. Fluid flow through zone 2 of the formation is thereafter halted as indicated by solid lines 18.

After a number of ball sealers have been seated in the perforations 14 of zone 2 sufficient to seal off zone 2, an injection fluid containing a temporary blocking agent in an amount sufficient to close off zones 1 and 3 is injected into well 10. This injection fluid containing the temporary blocking agent should be of a specific gravity in combination with the ball sealers blocking zone 2 to prevent dislodgement of the ball sealers 12. Blocking agents utilized should be of a composition and specific gravity sufficient to close pores in the formation for the desired time period.

Blocking agent compositions sufficient for this purpose are described in my U.S. patent application herein identified as Ser. No. 625,430 filed June 28, 1984. This application is hereby incorporated by reference. Of course, as is understood by those skilled in the art, the temporary blocking agent employed will vary depending upon formation conditions and the time period for which it is desired to temporarily close pores in the formation or reservoir zone having lesser degrees of permeability.

A preferred mixture used to obtain the desired stability and rigidity, for example, is a mixture of hydropropyl guar cross-linked with transitional metals and ions thereof. The purpose of the transitional metal ions is to provide increased strength, stability and rigidity for the gel.

Hydropropyl guar is placed into the gel mixture in an amount of from about 0.70 to about 10.0 weight percent of said mixture. As preferred, hydropropyl guar is placed in said mixture in about 7.2 percent by weight of said mixture.

Metallic ions which can be used in the pumpable gel mixture include titanium, zirconium, chromium, antimony and aluminum. The concentration of these transitional metals in the pumpable gel fluid will of course vary depending upon the nature of the wellbore and formation into which is is placed. Although the exact amounts of the metals required will vary depending on the particular application, it is anticipated that the metals should be included within the pumpable gel fluid in amounts of from about 0.005 weight percent to about 0.50 weight percent, preferably about 0.01 weight percent of said fluid. After the gel has remained in the formation for the desired time period, it can be removed.

One variation, which can be utilized to facilitate removal of the gel from wellbore 10 and formation 20 within a desired time period is to include therein a gel breaker. This gel breaker, included in the gel mixture, is selected from a group of chemical compounds which can break down the solid gel at temperatures of less than from about 60° F. to about 250° F. Generally this breakdown will occur within from about 2 hours to about 24 hours depending upon type and concentration of breaker added. Chemicals satisfactory for use as gel breakers, and which are incorporated into the gel mixture, include enzymes and oxidizing agents, suitable for breaking down the solid gel (such as sodium persulfate). Other gel breakers sufficient for this purpose are discussed in U.S. Pat. No. 4,265,311 issued to Ely on May 5, 1981, which patent is hereby incorporated by reference. These chemicals are readily available from chemical suppliers and with the exceptions of enzyme breakers are sold under their chemical names. Enzyme breakers can be obtained from oil field service companies. The concentration of the gel breaker incorporated into the gel mixture will vary from about 0.01 weight percent to about 0.10 weight percent, preferably about 0.05 weight percent of the gel mixture. When a temperature of from about 60° F. to about 150° F. is reached, the gel breaker will breakdown the solid gel causing it to liquify for removal from the wellbore 10 and formation 20.

Another method for breaking the gel when used as a temporary blocking agent is to contact the solidified gel with a mineral acid after lapse of a suitable or desired time interval. In those instances where it is undesirable to have a gel breaker incorporated into the gel mixture to remove the solid gel from the wellbore 10 and formation 20, it is preferred to use hydrochloric acid of a strength sufficient to solubilize the solid gel 22 without attacking the wellbore 10 or formation 20. Hydrochloric acid, and acids similar thereto, can be used to breakdown the solid gel on contact. Hydrochloric acid of a concentration of about 10 percent to about 28 percent preferably about 15 percent, by volume of solution, will generally be sufficient for this purpose. Although hydrochloric acid has been mentioned, other similar mineral acids and strong organic acids may be employed depending upon their availability, as is known to those skilled in the art. Another method which can be used to temporarily plug a formation is disclosed in U.S. Pat. No. 3,658,129 issued to Lanning et al. on Apr. 25, 1972. This patent is hereby incorporated by reference.

While the temporary blocking agent remains in the wellbore 10 and formation 20, as shown by the broken lines in zone 1 and 3, the ball sealers 12 are removed from perforations 14 in zone 2. This can be accomplished via use of an injection fluid having a specific gravity less than said ball sealers which cause the ball sealers to be buoyed up. When this occurs, the ball sealers can be circulated from the well 10.

After removal of the ball sealers 12, a permanent blocking agent is placed in zone 2 via perforations 14. Suitable permanent blocking agents which can be used are Portland Cement or rigid stable gel plugs, which cn be injected by means known to those skilled in the art. A suitable method utilizing a permanent blocking agent is disclosed in U.S. Pat. No. 3,010,514 issued to D. M. Fox on Nov. 28, 1961, which patent is hereby incorporated by reference. Once the perforations 14 communicating with zone 2 have been closed by the permanent blocking agent, the temporary blocking agent in zones 1 and 3 can be removed.

This can be accomplished by utilizing the gel in combination with one of the dissolution techniques discussed above. The nature of the gel and dissolution technique of course will vary depending upon the conditions encountered in the hydrocarbonaceous formation or reservoir. Afterwards, a waterflood or other recovery technique can be commenced to remove hydrocarbonaceous fluids from zones 1 and 3. Zones 1 and 3 are the zones of lesser permeability and the hydrocarbonaceous fluids can be removed therefrom via at least one production well in fluid communication with at least one injection well.

Although the present invention has been described with preferred embodiments, it is to be understood that modifications and variations may be resorted to without departing from the spirit and scope of this invention, as those skilled in the art will readily understand. Such modifications and variations are considered to be within the purview and scope of the appended claims.

What is claimed is:

1. A method for selectively closing off zones in a hydrocarbonaceous fluid producing formation or reservoir which contains at least one zone of greater permeability and at least one zone of lesser permeability which method is effective in producing increased amounts of hydrocarbonaceous fluids and where said zones are in fluid communication with at least one injection well and at least one production well comprising:
   (a) determining the permeability profile of said formation or reservoir and ascertaining the existence of at least one zone of greater permeability and at least one zone of lesser permeability;
   (b) introducing into the wellbore having perforations therein fluidly connected to said zones, an injection fluid with ball sealers therein which are sufficient to seal off said zone of greater permeability when seated in said perforations;
   (c) injecting a temporary blocking agent into said zone of lesser permeability which agent is sufficient to close pores in said zone of lesser permeability;
   (d) removing said sealers from said zone of greater permeability;
   (e) injecting a permanent blocking agent into said zone of greater permeability after removal of said ball sealers;
   (f) causing a reaction to take place in said zone of lesser permeability which reaction is sufficient to remove said temporary blocking agent; and
   (g) injecting a fluid sufficient to remove hydrocarbonaceous fluids from said zone of lesser permeability via said production well.

2. The method as recited in claim 1 where in step (b) buoyant ball sealers are used in combination with said injection fluid to seal off said zone of greater permeability.

3. The method as recited in claim 1 where in step (b) non-buoyant ball sealers are used in combination with said injection fluid to seal off said zone of greater permeability.

4. The method as recited in claim 1 where a gel comprises said temporary blocking agent in step (c).

5. The method as recited in claim 1 where a gel in combination with a gel breaker comprises said temporary blocking agent in step (c).

6. The method as recited in claim 1 where in step (e) said permanent blocking agent comprises cement.

7. The method as recited in claim 1 where in step (f) a gel in combination with a gel breaker comprises said temporary blocking agent with breaker reacts with said gel to cause liquefaction which enables removal of said gel.

8. The method as recited in claim 1 where in step (f) a gel comprises said temporary blocking agent which gel is subsquently reacted with a mineral acid or a strong organic acid to cause liquefaction which enables removal of said gel.

9. The method as recited in claim 1 where in step (f) a gel comprises said temporary blocking agent which gel is subsequently reacted with hydrochloric acid in a strength sufficient to cause liquefaction which enables removal of said gel.

10. The method as recited in claim 1 where in step (f) a gel comprises said temporary blocking agent which gel is subsequently reacted with hydrochloric acid in a strength of from about 10 percent to about 28 percent, preferably about 15 volume percent.

11. The method as recited in claim 1 where in step (e) said permanent blocking agent comprises a stable rigid gel plug.

* * * * *